FIG. 2.

INVENTORS
Hubert Crehan
and William A. Crehan
by William B. Wharton
their attorney

Feb. 28, 1928.

H. CREHAN ET AL

1,660,416

NUTTING MACHINE

Filed May 8, 1923    6 Sheets-Sheet 4

INVENTORS
Hubert Crehan and William A. Crehan
by William B. Wharton
their attorney Patented Feb. 28, 1928.

1,660,416

UNITED STATES PATENT OFFICE.

HUBERT CREHAN, OF PITTSBURGH, AND WILLIAM A. CREHAN, OF BRIDGEVILLE, PENNSYLVANIA.

NUTTING MACHINE.

Application filed May 8, 1923. Serial No. 637,550.

This invention relates to a nutting machine, or machine for automatically screwing nuts on bolts.

A general object of the invention is to provide a machine which will attach nuts to bolts rapidly and efficiently.

A more specific object of the invention is to provide a machine which provides relatively simple means for advancing, withdrawing, and rotating nut supporting heads with respect to bolts which are held stationary in position for the attachment of the nuts; and which is also so arranged that there is no possibility of jamming the machine if an oversize bolt or one having a defective thread should be presented to have a nut screwed thereon.

A further object of the invention is to provide a strong and simple operating or nutting head, which is so arranged that there is no possibility of jamming nuts in the operating or nutting head due to irregularities in their size or shape.

A further object of the invention is to provide a machine in which two operating heads may be actuated by the same operating mechanism.

A still further object of the invention is to provide a machine in which such pair of operating heads may be duplicated, two pairs of heads and the bolt feeding means therefor being actuated by the same central operating means.

In the accompanying drawings Figure 12 is a central vertical section through one of the operating or nutting heads of the machine; Figure 14 is a central horizontal section through one of the operating or nutting heads; Figure 15 is a cross sectional view through one of the operating heads on the line 15—15 Figure 14; Figure 16 is a front elevation of one of the operating heads.

In the drawings the reference numeral 1 designates the table or platform upon which the operating elements of the machine are mounted. The machine as illustrated is in fact an assembly of two separate machines; which are each complete in themselves, but both of which are operated from the same power transmitting means, and which may be mutually synchronized. These separate elements have separate operating shafts 2 and 2ª, which are both mounted in the central standard 3 and respectively in standards 4 and 4ª. The shaft 2 carries a bevel pinion 5 and the shaft 2ª carries a bevel pinion 5ª. Meshing with both of these pinions is a pinion 5ᵇ on a shaft 6, which carries a pulley 6ª and a clutch 6ᵇ. The means for presenting bolts for the attachment of nuts comprise a countershaft 7, which is common to both machine elements and is mounted in the standards or brackets 3 and in standards or brackets 8. This shaft carries a gear 9, which meshes with an idler gear 10 on a stub shaft 11 in the central standard 3. This idler in turn meshes with a pinion 12 on the operating shaft 2.

Substantially all the remaining elements of the machine are merely duplicated on both sides of the machine, and such elements will therefore be described for the sake of convenience as though each side constituted a separate machine.

The means for presenting bolts for the attachment of nuts thereto, comprise the elements immediately hereinafter described. The actual means for receiving and carrying the bolts are mounted on a shaft 13, which is mounted in bearings 14 and operated by suitable connections with the counter shaft 7. The means for rotating this shaft comprise a ratchet wheel or disk 15, having thereon peripheral notches 16 in which engages a pawl 17. Swingingly mounted on shaft 7 is a curved lever arm 18 to which is pivotally attached a connecting rod 19, which is in turn pivotally connected with a crank 20 freely rotatable on the shaft 13.

The movement of counter shaft 7 is transmitted to act upon the ratchet disk 15 by means of a pinion 21, which is carried by the shaft 7 and meshes with a pinion 22 on a stud shaft 23. On this stub shaft 23 is a cam 24, which is arranged to act upon the lever arm 18. The action of cam 24 swings lever arm 18 outwardly into the position shown in dotted lines in Figure 3 of the drawings, so that pawl 17 acts to move ratchet disk 15 one step forward. As the high position of cam 24 moves out of contact with lever arm 18, the lever arm, and the members connected therewith, swing backwardly of their own weight into the position shown in full lines in Figure 3, with the pawl 17 engaged in a succeeding notch of the ratchet disk 15 ready for the next forward impulse.

Figure 3:
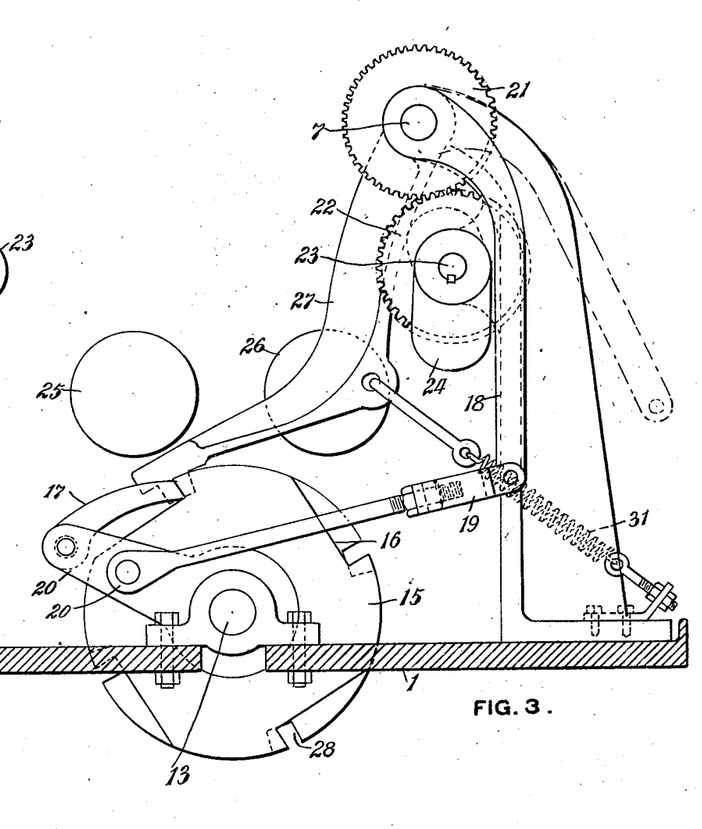
Figure 3 is a front elevation of the ratchet wheel and immediate operating mechanism therefor for actuating the bolt carrying elements of the machine, showing the same on an enlarged scale.
Figure 4:
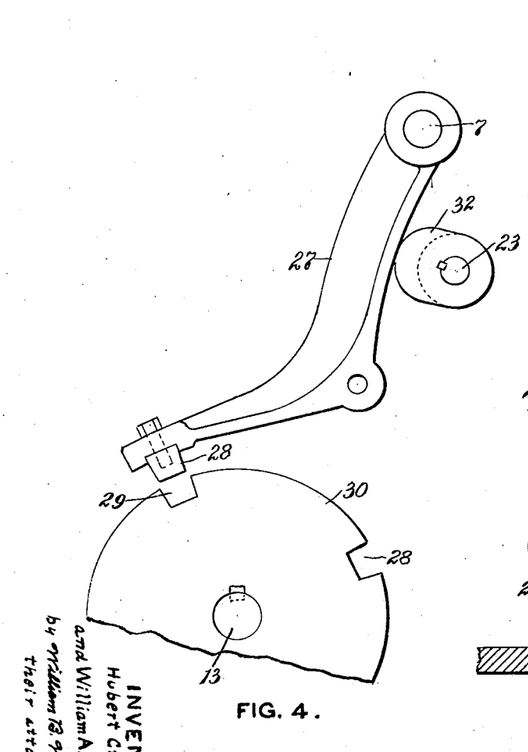
Figure 4 is an elevation on a similar scale showing the stop mechanism for holding the bolt carrying means stationary for the attachment of nuts to the bolts.
Figures 5, 6:
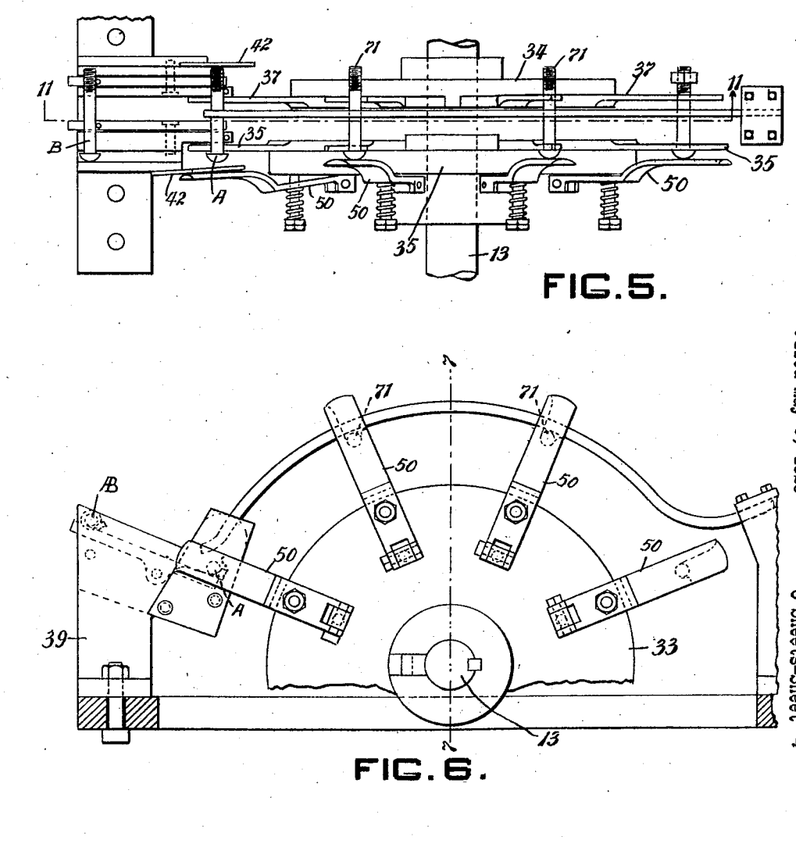
Figure 5 is a detail plan view of a portion of the machine and the means for feeding the bolts thereto.
Figure 6 is a front elevation of the same.
Figure 7:
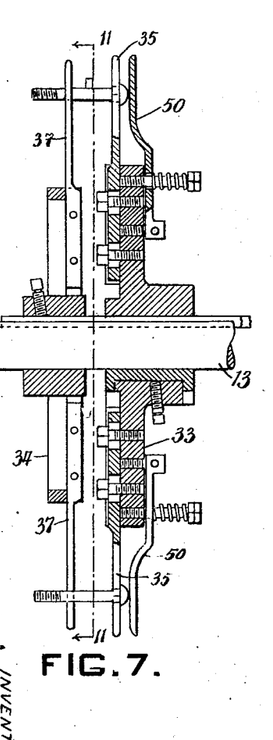
Figure 7 is a vertical section through the bolt carrying means on the line 7—7 Figure 6.
Figure 8:
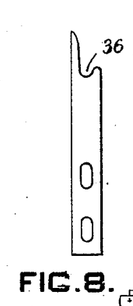
Figure 8 is a detail view showing one of the bolt supporting figures in side elevation.
Figure 9:
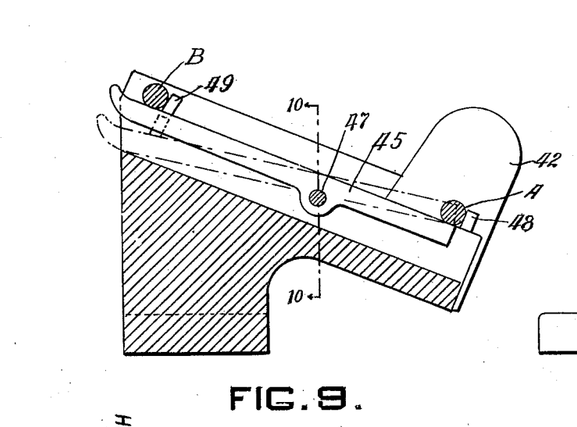
Figure 9 is a vertical section through the means for feeding bolts to the bolt carrier of the machine on the line 9—9 Figure 10.

The mechanism shown in Figure 4 of the drawings is provided to halt and maintain the shaft 13 with the bolt receiving and carrying means properly positioned with respect to the operating heads 25 and 26, which are indicated diagrammatically in Figure 3. This mechanism comprises an arm 27, which is freely rotatable on the shaft 7 and which has thereon a locking pin 28 arranged to engage in spaced notches 29 in the periphery of a locking disk 30. Yielding connections 31 serve to maintain the locking pin 28 in that one of the notches 29 with which it is engaged. The locking pin is withdrawn to permit movement of shaft 13 by means of a cam 32, which is carried by stub shaft 23 and which acts on an arm 27 to lift the same against the resistance of resilient connections 31.

The means for feeding and carrying the bolts are shown in detail in Figures 5 to 11 inclusive of the drawings. Such means comprise carrier disks or hubs 33 and 34 which are keyed to the shaft 13. Adjustably secured to the outer carrier 33 are radially extending fingers 35 which have their outer extremities formed to provide pockets 36 for the reception of bolts; and adjustably secured to the carrier 34 are radially extending fingers 37, which are provided with similar pockets 38.

As each forward movement of the bolt carriers must serve to place two bolts in position before the two operating heads 25 and 26, it is highly desirable to provide automatic means for feeding two bolts to the carriers at each forward impulse thereof. Such means are shown particularly in Figures 5, 6, 9, and 10 and 11 of the drawings, and comprise primarily the brackets 39 and 40, each of which is provided with a side wall 41 and with a guard plate 42 at the inner or operative end thereof. The brackets 39 and 40 are also provided respectively with inclined tracks 43 and 44 for feeding the bolts, and are also provided respectively with swinging rails 45 and 46 which are pivoted at one side of their center to the brackets 39 and 40 by means of bolts 47. The tracks 43 and 44 are provided at their inner or lower extremities with bolt retaining pins 48, and the swinging rails 45 and 46 at their outer extremities with bolt retaining pins 49.

Figure 10:
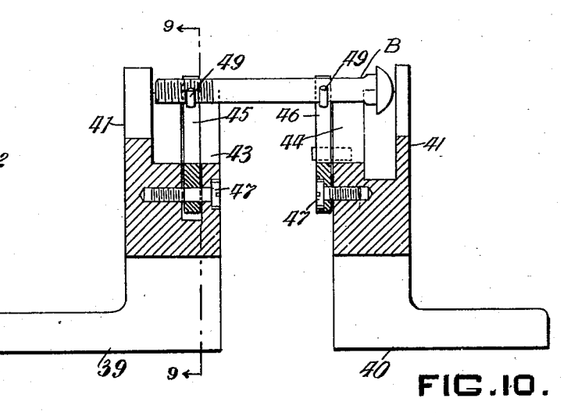
Figure 10 is a vertical section through the same on the line 10—10 Figure 9.
Figure 11:
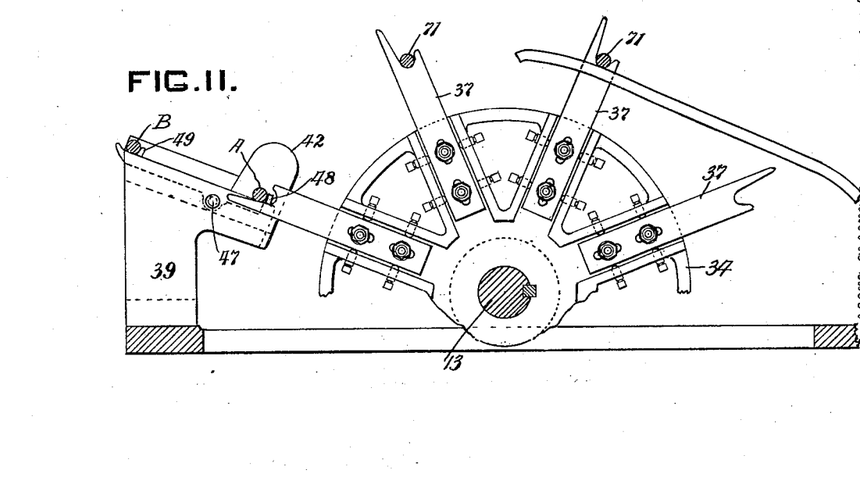
Figure 11 is a vertical section through the bolt feeding means on the line 11—11 Figures 5 and 7, looking in the direction of the arrows.

Figures 10 and 11 of the drawings show a bolt A in position to be picked up by the fingers of the carriers resting against the bolt retaining pins 48, and with a bolt B resting against the bolt retaining pins 49. As the fingers 35 and 37 pick up the bolt A, the inner or lower ends of the pivoted rails 45 and 46 are relieved of its weight, and the other or upper ends of the rails 45 and 46 fall downwardly of their own weight into a position in which the retaining pins 49 no longer prevent movement of the bolt B. This bolt B therefore rolls downward by gravity on tracks 43 and 44 and the lower portion of rails 45 and 46, until it is checked and retained by the pins 48 on the tracks 43 and 44, in position to be picked up by the fingers of the carriers; while the rails 45 and 46 are brought into their set position, ready to receive another bolt, by the weight of the bolt resting upon their lower extremities. This action is illustrated particularly in Figure 9 of the drawings.

Secured to the outer side of the outer carrier 33 are a plurality of plates 50 of resilient metal arranged to bear against the heads of the bolts which are supported by the fingers of the carriers, so that they are held firmly but yieldingly for attachment of the nuts. As will be seen in Figure 5 of the drawings, the resilient plates 50 are prevented from coming into contact with the head of bolt A by guard plate 42.

The operating or nutting heads 25 and 26 are carried by spindles 51 and 52 which have bearing in the standard or upright 4 and in a similar standard or upright 53. At the inner extremities of the spindles are gears 54 and 55 both of which mesh with a wide gear 56 on the operating shaft. The meshing of these gears 54 and 55 with the wide gear 56 serves to produce rotation of the spindles; while special means are provided for converting rotation of the operating shaft into backward and forward movement of the spindles.

Such means for operating the spindles 51 and 52 comprise a pinion 57 meshing with a pinion 58 on the short jack shaft 59. A pinion 60 on the jack shaft 59 meshes with a gear 61 freely rotatable on the end of the operating shaft. The gear 61 carries a cam 62 against which bears a contact roller 63, which is carried by an operating lever 64 having branches 65 and 66. The operating lever 64 is pivotally mounted at 67, and each of the branches 65 and 66 has a slot and pin engagement 68 with one of the collars 69 and 70 on the operating spindles 51 and 52.

Figure 1:
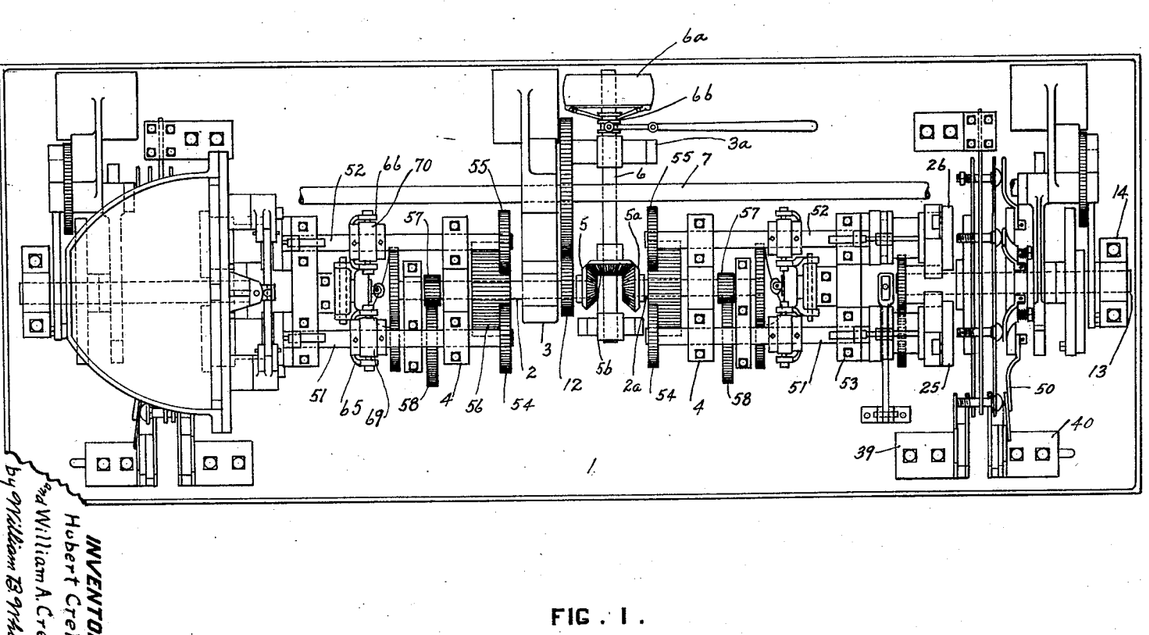
Figure 1 is a plan view of the machine of the present invention.
Figure 2:
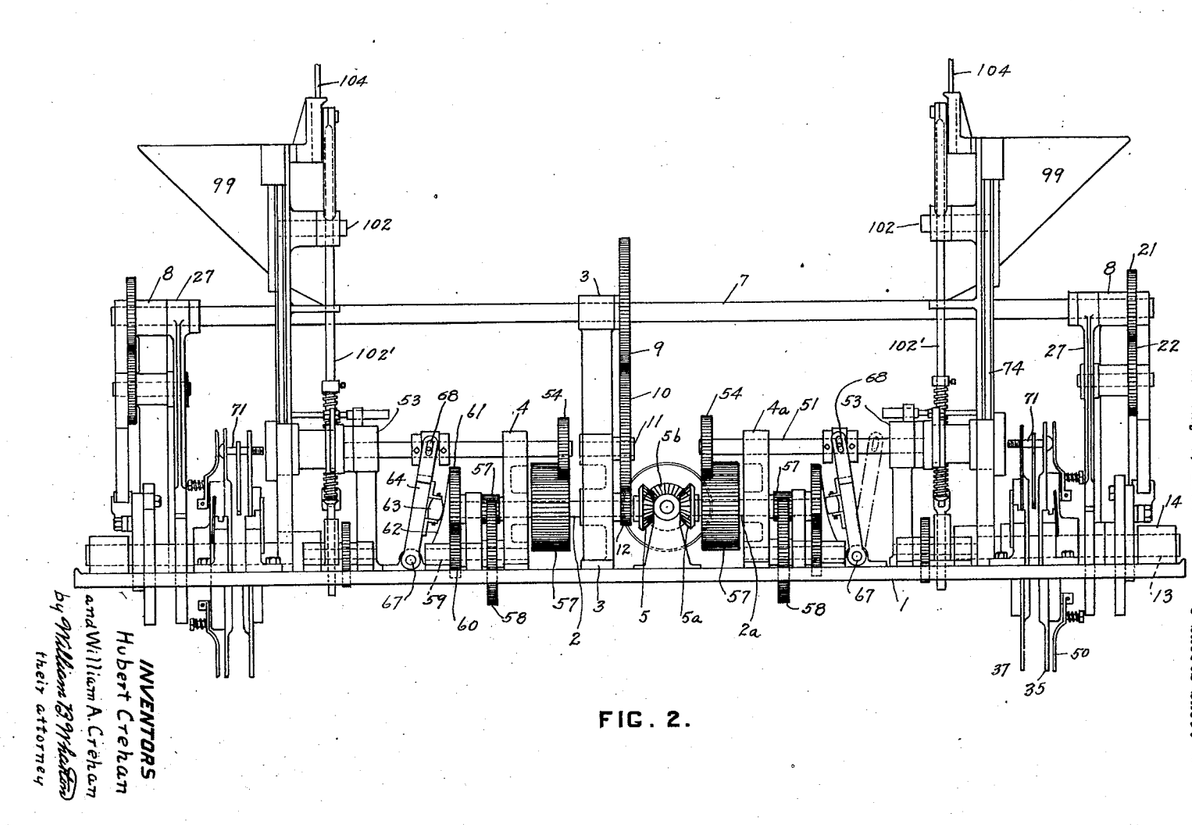
Figure 2 is a side elevation thereof.

As the gear 61 rotates, the action of cam 62 against the contact roller 63 moves the operating levers outward into the position shown in dotted lines in Figure 2, and rearward into the position shown in full lines in Figure 2. It will be understood that the action of the spindles is synchronized with that of the bolt, feeding and carrying mechanism by the arrangement of the operating connections for both elements.

With bolts 71 held in position before both of the operating heads 25 and 26, the forward movement and rotation of spindles 51 and 52 serves to screw nuts on both of the bolts.

Each of the operating or nutting heads comprises a forward portion or chuck 72, which has in the forward end thereof a radially disposed nut receiving slot or channel 73 arranged to match with the discharge end of a nut supplying chute 74 in the stationary or charging position of the operating head. In order that the operating head may be held stationary for receiving nuts it is freely mounted on its spindle, and special means are provided for causing it to rotate with the spindle for screwing the nuts on the bolts.

For the purpose of holding the chuck to the spindle to rotate therewith blocks 75 lie in suitable orifices in the chuck and in contact with the spindle 51. Against these blocks bear contact members 76 which are mounted on the chuck 72 by means of resilient plates 77 secured to the chuck by bolts or the like 78. The chuck 72 thus is not only carried backward and forward with its spindle but being frictionally engaged therewith is caused to rotate with the spindle unless positively prevented from so doing.

In order to positively prevent rotation of the chuck and to retain it in proper position to receive nuts from the nut supplying chute 74, the rearward face of the chuck is provided with a stop pin 79. Upon rearward movement of the spindle this pin enters a segmental groove 80 in a plate 81 which is secured to the standard 53. When pin 79 enters this groove the rotation of the chuck continues until the pin comes in contact with the end of the groove, after which the spindle rotates idly within the chuck until it is again moved forward from its rearward position. The groove 80 is so arranged that when the pin 79 reaches its end the nut receiving channel 73 of the chuck is in register with the nut supplying chute 74 to receive nuts therefrom.

As the nuts 82 feed by gravity into the channel 73 of the chuck, means are provided for retaining in position in the chute such nuts as have not yet entered the channel. For this purpose the pin 83 is carried by a collar 84, which is held between shoulders 85 on the chuck and within which the chuck may rotate freely. The pin 83 is held and guided by means of a socket 85 on the standard 53 into which the rearward portion of the pin extends. In the rearward position of the spindle and operating head, shown in Figure 12 of the drawings, the pin is withdrawn from the nut supplying chute 74; but in the forward or operating position of the spindle, the pin enters the last of the nuts in the chute and holds it until the spindle is again moved rearwardly.

Figures 13, 17, 18, 19:
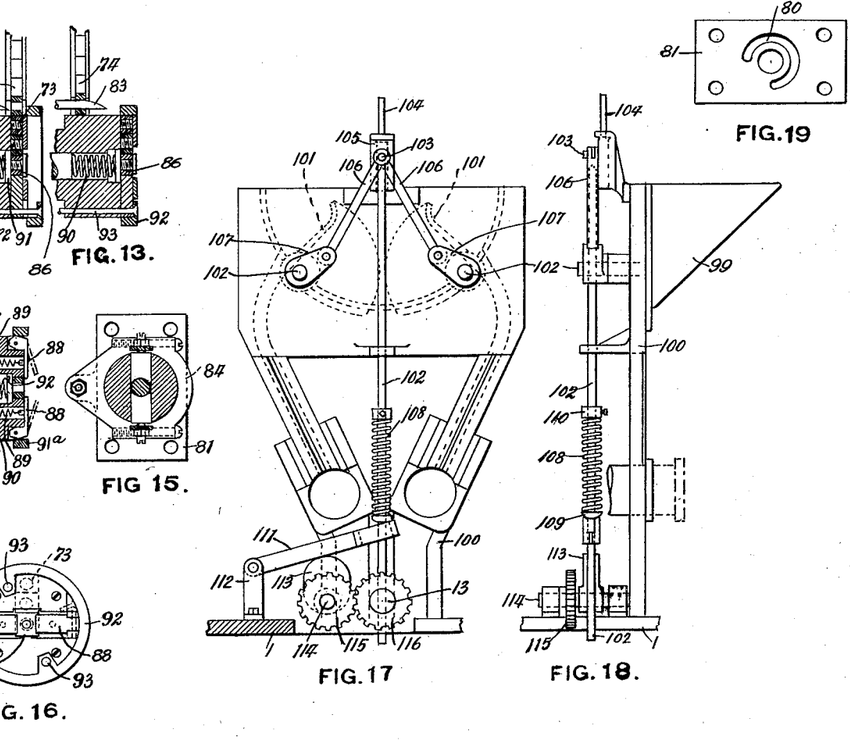
Figure 13 is a similar, but fragmentary, view thereof illustrating a different position of the operating or nutting head.
Figure 17 is a front elevation of the means for feeding nuts to the operating heads.
Figure 18 is a side elevation thereof.
Figure 19 is a front elevation of one of the stop plates which cooperate with the operating heads for positioning the same to receive nuts from the nut feeding means.

As will be seen from Figures 12 and 13 of the drawings, the nut receiving channel 73 in the chuck 72 is capable of containing three nuts simultaneously. Of these the lowermost nut 86, which is the one for attachment to the bolt, lies immediately within an aperture 87 of sufficient size to permit passage of the nut from the chuck 72. This nut is normally retained in the chuck by means of plates 88, which are pivotally mounted in the forward face of the chuck and which are yieldingly held thereto by means of light coiled springs 89 lying within elongated apertures 89ª in the chuck. When, therefore, the nut 86 has been screwed on a bolt and the spindle is retracted, the light springs 89 yield sufficiently to permit the operating head to be drawn away from the nut, which is left upon the bolt to which it is screwed.

In order that the nut 86 may be held firmly, but not too rigidly, while being screwed to the bolt yielding means are provided for bearing against the inner face of the nut. Such means comprise a coiled spring 90 which bears against the forward extremity of the spindle 51 and against a washer 91 in the outer or forward portion of the chuck 72. In order that the spring 90 may not tend to force the nut out through aperture 87, the washer 91 bears against shoulders 92, which are shown in Figure 14 of the drawings.

It is necessary that a guard ring or the like be provided on the forward face of the chuck 72 in order that the nuts in the channel 73 may not be thrown outwardly as the head is rotated during the forward movement in which the nut is screwed on the bolt. In prior devices such ring has been mounted in a fixed manner to some portion of the machine in order that the chuck of the operating head might enter it during the forward movement of the head, and it has therefore been necessary to provide means for permitting bolts to pass through such ring into proper position before the operating head. As such means are necessarily particularly subject to breakage, one feature of the present invention is to provide a nut retaining guard which is movable with the remainder of the operating head, so that it does not interfere with passage of the bolts; and which does not interfere with entry of nuts into the operating head. Such guard member is a continuous ring 91$^a$, which is secured to the operating head by means of stems or pins 93, which pass through the chuck 72 and which are surrounded by a coiled spring 94 exerting a constant tendency to draw the ring rearwardly over the forward portion of the chuck. In retracted, or charging, position of the operating head the ring 92 bears against the nut supplying chute 74 and is thus held in such position that it does not prevent the entry of nuts into the channel 73 in the chuck. In the forward, or screwing on, position of the head the ring 92 is drawn rearwardly over the forward portion of the chuck and effectually prevents nuts being thrown therefrom during whirling of the head.

As stated above, the chuck 72 is held against rotation by the engagement of the pin 79 in the groove 80 of plate 81, in order that the chuck may receive in its channel 73 nuts from the supplying chute 74. Yielding means are also provided whereby the chuck is normally carried with the spindle in its forward movement to screw a nut on a bolt; but which permit the spindle to move forwardly in the chuck should forward movement of the latter be resisted because of the jamming of an oversize nut, or one of irregular shape, between the chuck and the supply chute 74.

For such purpose the spindle is provided with a circumferential groove 95, which is preferably angular in cross section. In this groove 95 engage tapered pins 96, which are held therein by means of light helical springs 97 housed in the body of the chuck. The force which the springs 97 exert on the pins 96 may be regulated by means of set screws 98, which are screw threaded in tapped orifices in the body of the chuck and arranged to bear against the springs. In the retracted position of the operating head the tapered pins 96 engage in the groove 95. As the spindle moves forwardly, the tapered pins normally maintain the chuck in engagement with the spindle to screw the nut on the bolt. If, however, the forward movement of the chuck be opposed by the jamming of a nut in the chute and nut receiving channel, the helical springs 97 yield sufficiently to permit the pins to ride out of the groove so that the spindle may move forwardly in the chuck without injuring the mechanism of the device by forcing the same.

The means for supplying nuts to the chutes 74 are generally similar to those shown and described in the prior patent to Hubert Crehan No. 1,149,553, dated August 10, 1915. Such means, illustrated particularly in Figures 17 and 18 of the drawings, comprise primarily a nut hopper 99, mounted on a supporting standard 100, and nut handling blades 101 eccentrically pivoted on pins 102. The operating means for the blades 101 comprise a vertically movable push rod 102 connected by means of a pin 103 with a guide rod 104 in a guide 105. Pivotally mounted on the pin 103 are links 106, each of which connects with a crank 107 on one of the blades 101, so that vertical movement of the push rod 102 serves to operate the blades 101 and cause the nuts in the hopper to enter the receiving end of the chutes 74. Part way of its length push rod 102 is surrounded by a coiled spring 108 between collars 109 and 110. Against collar 110 bears an arm 111, which is pivoted in a bracket 112. A cam 113 on jack shaft 114 is arranged to bear against 111 to operate the same. This shaft 114 carries a pinion 115 which meshes with a pinion 116 on the same shaft 13 which carries the bolt supplying means of the machine. The mechanism for supplying nuts to the nut supplying chutes are thus operated during movement of the bolt carrier of the machine.

The machine as a whole thus provides a double acting machine in which two pairs of operating heads and two mechanisms for presenting bolts thereto are operated in unison from a single power shaft, the machine being so arranged that bolts are presented simultaneously to both operating heads of each pair for the attachment of nuts to the bolts.

The machine also provides automatic means for supplying bolts to the bolt feeding mechanism, and provides a greatly improved operating head for attaching the nuts to the bolts.

What we claim is:

1. In a machine for screwing nuts on bolts the combination of a pair of nut screwing heads, means for simultaneously advancing and retracting both of said heads and for rotating the same; with means arranged to supply nuts simultaneously to both of said heads, a rotatable bolt carrier arranged to present bolts simultaneously to both of said heads, and means for supplying two bolts at a time to said carrier.

2. In a machine for screwing nuts on bolts the combination of a pair of nut screwing heads, means for simultaneously advancing and retracting both of said heads and for rotating the same; with means for supplying nuts simultaneously to both of said heads, a rotatable bolt carrier, means for alternately imparting movement to said bolt carrier and maintaining the same in a position of rest, and means for supplying two bolts to said carrier during each period of movement thereof.

3. In a machine for screwing nuts on bolts the combination of a pair of nut screwing heads, means for simultaneously advancing and retracting said heads and for rotating the same; with means for supplying nuts simultaneously to said heads, and a bolt carrier comprising a hub, fingers provided with bolt receiving sockets on said hub, resilient members arranged to press against bolts carried by said fingers, means for rotating said carrier with a step by step movement, and means for supplying two bolts to the carrier with each forward impulse thereof.

4. In a head for screwing nuts on bolts the combination of a chuck provided with a nut receiving groove, a guard arranged to slip over the chuck and close the orifice at the outer extremity of said groove, and yielding means for normally maintaining said guard in position to close said orifice.

5. In a head for screwing nuts on bolts the combination of a chuck provided with a nut receiving groove; a guard arranged to slip over the chuck and close the orifice at the outer extremity of said groove, and yielding means for normally maintaining the guard in position to close the orifice; means for normally maintaining a nut in said groove in position to be attached to a bolt comprising pivotally mounted plates, and resilient means secured in the body of the chuck and arranged to yieldingly hold said plates to the nut in the groove.

6. In a machine for screwing nuts on bolts the combination of an operating spindle, means for advancing and retracting said spindle and for rotating the same, a chuck provided with a nut receiving groove on said spindle, means for attaching the chuck yieldingly to the spindle for forward movement therewith, a guard arranged to slip over the chuck and close the orifice at the outer extremity of said groove, and yielding means for normally maintaining said guard in position to close said orifice.

7. In a machine for screwing nuts on bolts the combination of a main shaft, a pair of operating spindles, nut screwing heads on said spindles, a cam disk on the main shaft, unitary means arranged to contact said disk, connections from said unitary means to both of the spindles for advancing and retracting the spindles simultaneously, means arranged to supply nuts simultaneously to both of said heads, and means for presenting bolts simultaneously to both of said heads.

8. In a machine for screwing nuts on bolts the combination of a main shaft, a pair of operating spindles, nut screwing heads on said spindles, a cam disk on the main shaft, a roller arranged to ride on the cam disk, levers connecting both of said spindles with the rollers for advancing and retracting the rollers simultaneously, means arranged to supply nuts simultaneously to both nut screwing heads, and means for presenting bolts simultaneously to both heads.

In testimony whereof, we hereunto set our hands.

HUBERT CREHAN.
WILLIAM A. CREHAN.